United States Patent [19]
Widdel

[11] 3,814,005
[45] June 4, 1974

[54] PIZZA PIE CRUST DEVICE

[76] Inventor: John E. Widdel, 1704 4th Ave., S.E., Minot, N. Dak. 58701

[22] Filed: July 6, 1972

[21] Appl. No.: 269,326

[52] U.S. Cl................... 99/349, 99/353, 99/372, 99/379, 99/380, 99/427
[51] Int. Cl............................................. A47j 37/06
[58] Field of Search............ 99/349, 352, 353, 372, 99/374, 375, 376, 377, 379, 380, 381, 384, 422, 426, 427, 428, 432; 219/524, 525

[56] References Cited
UNITED STATES PATENTS
2,078,189    4/1937   Bemis.................................. 99/375

*Primary Examiner*—Billy J. Wilhite
*Attorney, Agent, or Firm*—Robert E. Kleve

[57] ABSTRACT

The invention comprises a pizza pie crust making device for making pizza pie crusts. The device has a housing and an upper and lower disc member. The lower disc member is fixed to the housing. The upper disc member has a flat lower surface and is pivotally mounted to the housing to pivot down flush upon the lower disc member. The lower disc member has an annular central recessed portion with an annular groove about the outer edge, which when the upper disc member is pivoted down flush against the lower disc member will form the hollow silhouette of a flat annular disc with an annular ridge. The upper and lower disc members have heating elements. Pizza pie crust dough will be placed between the disc member and the upper disc member will be pivoted down flush against the lower disc member to compress the pissa pie crust dough into the shape of the silhouette and the heating elements will at least partially bake or cook the dough, so as to retain its shape, as compressed between the disc members.

1 Claim, 7 Drawing Figures

PATENTED JUN 4 1974  3,814,005

PIZZA PIE CRUST DEVICE

This invention relates to cooking or baking equipment. more particularly the invention relates to apparatus for making pizza pie crusts.

It is an object of the invention to provide a novel pizza pie crust making device which easily and rapidly molds a pizza pie crust dough to a disc-like crust and partially pre bakes the crust.

It is another object of the invention to provide a novel pizza pie crust making device which easily and rapidly molds pizza pie crust dough into flat shape with a raised ridge about its outer edge.

It is another object of the invention to provide a novel pizza pie crust making device which easily and rapidly molds pizza pie crust dough into an annular disc-like shape with a ridge about its outer edge and which partially pre cooks the molded dough to retain its shape, so that at a later date the materials to complete the pizza pie may be placed upon the disc-like pie crust and retained thereon by the ridge and the pie thereupon completely cooked.

Further objects and advantages of the invention will become apparent as the description proceeds and when taken in conjunction with the accompanying drawings wherein:

FIG. 1 is a side elevational view of the pizza pie crust making device.

Briefly stated, the invention comprises a pizza pie crust making device having an upper and lower disc member, said upper disc member is pivotally mounted to close over the lower disc member, said lower disc member has recessed portions thereon, heating elements are mounted in the disc members, whereby pizza pie crust dough may be placed between the disc member and the upper disc member closed against the lower disc member which will compress to the dough into a disc-like shape with an annular ridge about its circumference, and the heating element will partially shape the dough to retain its shape, and the crust removed, and materials to complete the pizza pie placed upon the disc-like portion with the ridge retaining the materials thereon, and the pizza pie may then be completely baked.

Figure 2:
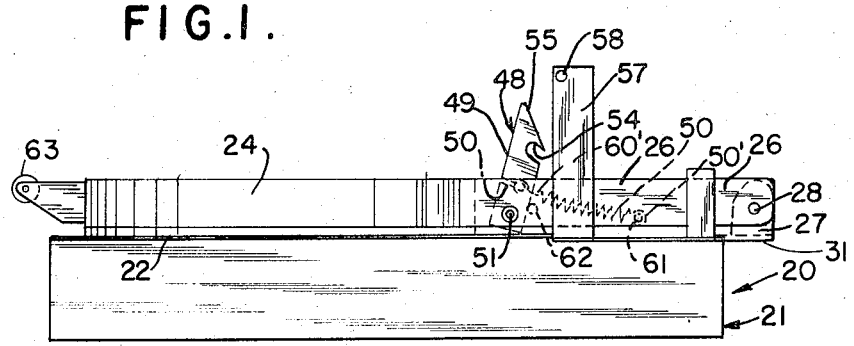
FIG. 2 is a top plan view of the pizza pie crust making device.
Figure 3:
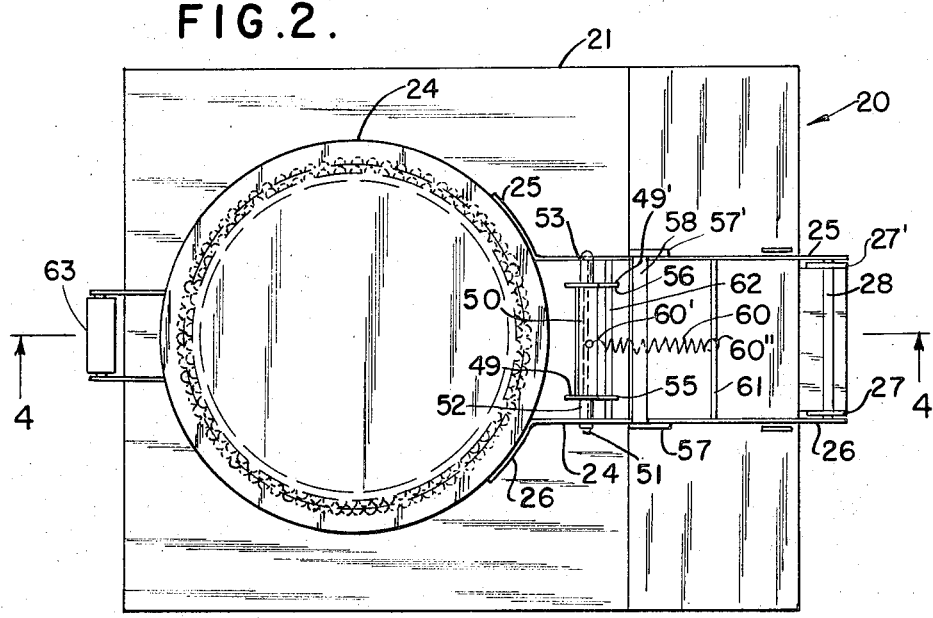
FIG. 3 is an enlarged side elevational view of the upper and lower disc members.

Referring more particularly to the drawings, in FIGS. 1, 2, and 3, the pizza pie crust making device 20 is illustrated having a rectangular sheet metal housing 21 with a metal lower disc member 22 mounted centrally upon the top 23 of the housing 21. Second annular disc member 24 is pivotally mounted to the housing 21 by a pair of elongated rigid metal side straps 25 and 26 which are fixed to the side wall 27 of the disc member 24 at their one ends and their other ends are pivotally mounted to a bolt 28, which bolt 28 passes through the other ends of straps 25 and 26 and through upright flanges 27 and 27'. The upright flanges 27 and 27' are fixed to a horizontal flange 31 which flange 31 is fixed to the rear of the housing 21.

The lower disc member 22 has a recessed area 32 which includes a central recessed annular flat portion 33, with an annular groove 33' about the edge or circumference of the central annular flat portion 33. A plurality of rounded lateral grooves 34 are formed along the outside inclined wall 35 and aligned one after another about the circumference of the inclined wall 35.

Figure 4:
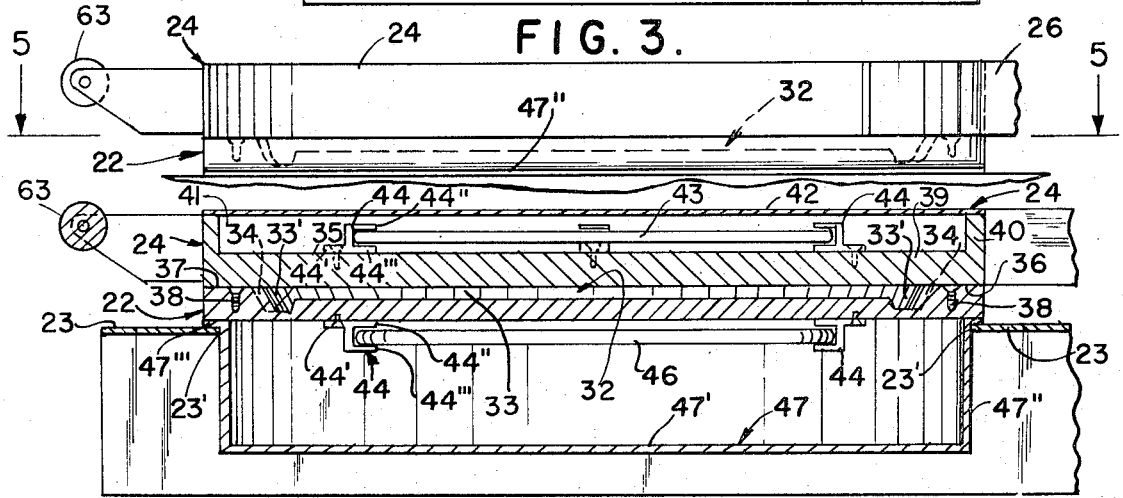
FIG. 4 is an enlarged cross-sectional view of the upper and lower disc members for molding the pizza pie crust, taken along line 4—4 of FIG. 2.
Figure 5:
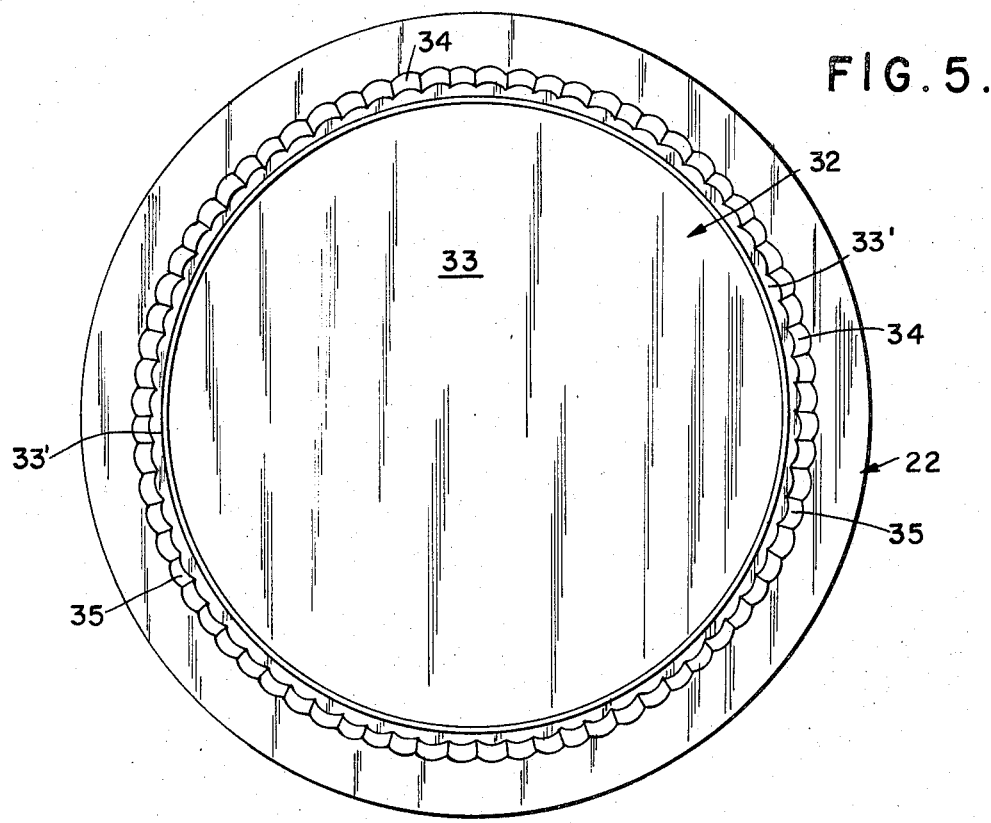
FIG. 5 is an enlarge view taken along line 5—5 of FIG. 3, illustrating a top plan view of the lower disc member.
Figure 6:
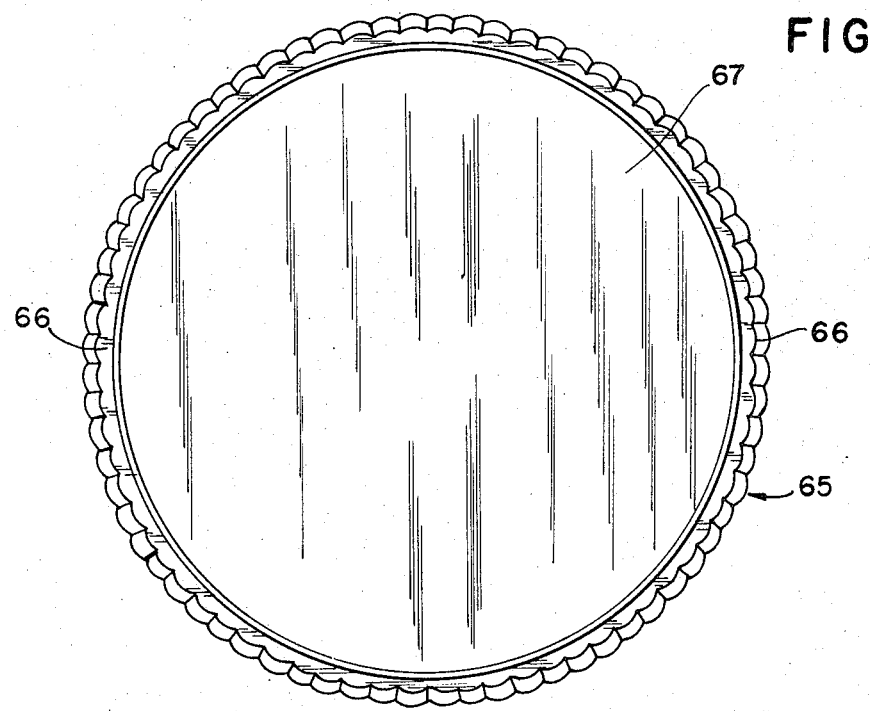
FIG. 6 is a top plan view of the pizza pie crust after being molded and partially baked in the pizza pie crust making device.

The upper disc member 24 has a flat under surface 36 which rests flush upon the upper surface 37 of the lower disc member when the upper disc member is pivoted down against the lower disc member. Four screws 38 are threaded into the upper surface 37 of the lower disc member 22 and they may be screwed upward from their position shown in FIG. 4 to adjustably space the upper disc member 24 so that its flat under surface 36 may be adjustably spaced away from the lower surface 37 of the lower disc member.

The upper disc member 24 is formed of an annular disc portion 39 with a raised annular wall 40 forming a recess 41 therein. A disc-like cover plate 42 is mounted over the top of the annular 40. A conventional heating element 43 is mounted in the recess 41 of the upper disc member 24 by four brackets 44 each of which has its one leg 44' fixed to the top of the disc portion 39 and their other two legs 44'' and 44''' surrounding and supporting the heating element 43. A similar conventional heating element 46 is mounted beneath the lower disc member 22 by four brackets 44 each of which has its one leg 44' fixed to the underside of the disc member 22 and their other legs 44'' and 44''' surrounding and supporting the heating element 46.

The lower disc member 22 is made of aluminum and has a steel insulating container 47. The steel insulating container 47 has a bottom 47', and cylindrical wall 47''. The upper annular flange 47''' of the container 47 is fixed to the underside of the disc member 22 by means of screws and other means. The top 23 of the housing is made of asbestoes and has a bore 23' therethrough. The insulating container 47 of the disc member projects through the bore 23'' in top 23 with the annular flange 47'' resting upon the edge of the housing top 23 surrounding the container.

A locking mechanism 48 is pivotally mounted to the side straps 25 and 26 of the upper disc member 24. The locking mechanism 48 has a pair of plates 49 and 49' fixed together by a lateral plate 50. The lower ends of the plates 49 and 49' are pivotally mounted to the side straps 25 and 26 by a bolt 51 which passes through bores in the plates 49 and 49' and through bores in the side straps 25 and 26. A pair of spacer sleeves 52 and 53 are rotatably mounted on the bolt 51, between the strap 25 and plate 49' and between strap 26 and plate 49 to align the plates 49 and 49' in permanently spaced relation to the straps 25 and 26.

The upper ends of the plates 49 and 49' have notched out areas 54 which form hooks 55 and 56. A pair of upright vertical straps 57 and 57' are fixed to the top 23 of the housing and project upward on opposite sides of the straps 24 and 25. A rod 58 is fixed between the upper ends of the straps 57 and 57'.

The plates 49 and 49' act to lock the disc member 24 in its pivoted open position, by the notched out areas 54 of the hooks 55 and 56 receiving and sliding onto the rod 58 between straps 57 and 57'. A coil spring 60 has one end 60' attached to the lateral plate 50 and its other end 60" attached to a brace 61 which brace is fixed between straps 25 and 26. The coil spring 60 urges the locking plates 49 and 49' clockwise about the bolt 51, when viewed from FIG. 1 against a rod 62 fixed between straps 25 and 26 and acts to limit the clockwise movement of the plates.

Operation

The pizza pie crust making device 20 operates as follows:

The operator will pivot the disc member 24 to its open position by grasping the handle 63 mounted to the front of the disc member 24 and pivoting the disc member clockwise upward away from disc member 22. The disc member 24 will pivot upward about the axis of bolt 28 and as the disc member 24 moves upward the tapered upward edges of the locking plates 49 and 49' will engage and slide along rod 58 causing the plates 49 and 49' to pivot counterclockwise in relation to the straps 25 and 26. This action will continue until the notched out areas 54 of the locking plates reach the rod 58, at which time the coil spring 60 which is urging the plates clockwise will pivot the notched out areas of the plates to slide them over the rod 58 and the hooked ends 55 and 56 in sliding onto the rod 58 will hold the disc member 24 in this open position, and lock it.

The operator will then or previous to this time energize the heating coils or elements 43 and 46 to heat the disc members 22 and 24, respectively, to their desired temperature for partially baking the pizza pie crust dough.

With the disc member 24 in its open position, the operator will place a quantity of pizza pie crust dough in the lower recessed area 32. Then he will pivot the plates 48 and 49 counterclockwise when viewed from FIG. 1 in phantom lines, causing the hooked portions 55 and 56 to slide off the rod 58, whereupon the disc member 24 will be pivoted down until it reaches its position shown in solid lines in FIG. 1, with the undersurface 36 flush against the top surface 37 of the lower disc member 22, or substantially flush depending upon the position of the adjustment screws 38. The disc member 24 will compress the pizza pie crust dough which will be of sufficient quantity and amount to cause the dough to fill the recessed area 32 of the disc member 22, including the central recessed portion 33 the annular groove portion 33' and the lateral grooves 34 of the lower disc member 22.

Also, the weight of the upper disc member 24, which is made of iron will be sufficient to compress the dough filling into the recessed area 32, without any substantial added force and pressure by the operator upon the handle of the disc member 22.

The disc member 24 will be left closed flush against the lower disc member until the dough in the recessed area is partially baked sufficiently by the heat of the heating elements 43 and 46 to retain its compressed shape.

Figure 7:
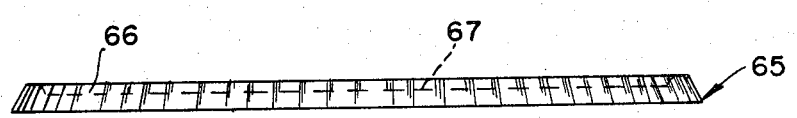
FIG. 7 is a side elevational view of the pizza pie crust after being molded and partially baked in the pizza pie crust making device.

Whereupon, the operator will pivot the upper disc member 24 upward to its open position until the hooks 55 and 56 have again hooked over the rod 58 to lock the disc member in its open position. The operator will then remove the pizza pie crust 65 baked into the shape of the recessed portion 32, and will invert it and place it upon a flat surface with its annular ridge 66 projecting upward as shown in FIG. 7. Then the operator will place the necessary food products to complete the pizza pie, such as sausage, cheese, and the like, upon the central recessed portion 67 of the pie crust 65, and the raised annular ridge 66 will act to retain the food products upon the central recessed portion 67. The pizza pie will then be suitably wrapped, frozen and shipped to stores for sale to the consumer. The consumer will then take the pizza pie, remove the wrapping, and complete or finish the baking of the pizza pie.

The annular ridge 66 acts to prevent the food products from slipping off the central recessed portion 67 during shipping to retail outlets.

Thus, it will be seen that a novel pizza pie crust making device has been provided which easily and rapidly makes and partially bakes a pizza pie crust with an annular ridge about the outer edge of the pie crust, which prevents the food product placed upon the central recessed portion of the crust to complete the pie from slipping off when shipped to the consumer.

It will be obvious that various changes and departures may be made to the invention without departing from the spirit thereof and accordingly, it is not intended that the invention be limited to that specifically described in the specification or as illustrated in the drawings but only as set forth in the appended claims wherein:

What is claimed is:

1. A pizza pie crust making device for making a pizza pie crust comprising a housing, a first and second disc like member, said first disc like member having a flat planar surface, said second disc like member having a relatively wide central flat disc like recess with a deeper relatively narrower annular shallow recessed channel extending about the central recess and deeper in depth than the central recess and in communication therewith, said flat planar surface of said first disc member confronting said central recess and deeper recessed channel of said second disc member, one of said disc members being movable toward the other of said disc members into a flush relationship, said disc members when moved together into said flush relationship forming the hollow silhouette of a flat planar disc configuration with a laterally projecting annular relatively shallow ridge in the recessed areas therebetween, heating means in said first and second disc like members whereby pizza pie crust dough will be placed between the confronting surfaces of said disc members and said one of said disc members will be moved into said flush relationship with said other disc member, and the heating means will at least partially bake the pizza pie crust dough into a crust while compressed into said silhouette so as to reatin its shape, whereby said crust will be removed after baking and serve as a flat pizza pie crust having a flat planar disc crust portion and a raised annular relatively shallow crust ridge portion to retain further components of a pizza pie for further baking to complete the pie.

* * * * *